United States Patent
Desjardins et al.

(10) Patent No.: US 10,272,863 B1
(45) Date of Patent: Apr. 30, 2019

(54) STRUCTURE AND METHOD FOR PROTECTING A PASSENGER DURING A CRASH

(71) Applicant: SAFE, INC., Tempe, AZ (US)

(72) Inventors: Stanley P. Desjardins, Scottsdale, AZ (US); Lance C. Labun, Tempe, AZ (US); April M. Pinger, Gilbert, AZ (US)

(73) Assignee: Safe, Inc., Tempe, AZ (US)

( * ) Notice: Subject to any disclaimer, the term of this patent is extended or adjusted under 35 U.S.C. 154(b) by 133 days.

(21) Appl. No.: 15/453,420

(22) Filed: Mar. 8, 2017

Related U.S. Application Data

(63) Continuation-in-part of application No. 14/530,581, filed on Oct. 31, 2014.

(51) Int. Cl.
| | |
|---|---|
| B60N 2/427 | (2006.01) |
| B60R 21/00 | (2006.01) |
| B60R 21/01 | (2006.01) |
| B64D 11/06 | (2006.01) |
| B60R 21/0136 | (2006.01) |

(52) U.S. Cl.
CPC ...... B60R 21/0136 (2013.01); B60N 2/42727 (2013.01); B64D 11/0619 (2014.12); *B60R 2021/0093* (2013.01); *B60R 2021/0102* (2013.01); *B60R 2021/01204* (2013.01)

(58) Field of Classification Search
None
See application file for complete search history.

(56) References Cited

U.S. PATENT DOCUMENTS

| | | | |
|---|---|---|---|
| 6,378,939 B1 | 4/2002 | Knoll et al. | |
| 6,394,393 B1 | 5/2002 | Mort et al. | |
| 6,820,931 B2 | 11/2004 | Ruff et al. | |
| 7,822,522 B2 | 11/2010 | Wereley et al. | |
| 7,878,312 B2* | 2/2011 | Hiemenz | B60N 2/4242 188/267.2 |
| 8,473,163 B2* | 6/2013 | Hiemenz | B60N 2/4242 248/562 |
| 2008/0156602 A1* | 7/2008 | Hiemenz | B60N 2/4242 188/267.1 |
| 2010/0332079 A1* | 12/2010 | Wang | B60N 2/4242 701/37 |
| 2011/0035118 A1* | 2/2011 | Hiemenz | B60N 2/4242 701/45 |

(Continued)

OTHER PUBLICATIONS

Desjardins: The evolution of energy absorption systems for crashworthy helicopter seats, Mar. 6, 2006.

*Primary Examiner* — Rami Khatib
(74) *Attorney, Agent, or Firm* — Hartman Titus PLC; John D. Titus

(57) ABSTRACT

A method and apparatus for protecting a passenger during a crash comprises a moveable seat with an energy absorber (EA) that allows the seat to stroke a finite distance to decelerate the passenger in a controlled manner. The seat is designed so that one of a plurality of fixed profile EA's can be selectively engaged to provide a tailored EA composite profile adapted to the occupant's weight and anticipated crash environment. The tailored EA composite profile applies a frequency matched, low onset force to the seat, which substantially eliminates problems associated with dynamic overshoot of the passenger's spine.

11 Claims, 9 Drawing Sheets

(56) References Cited

U.S. PATENT DOCUMENTS

2011/0233975 A1* 9/2011 Mindel ................... B60N 2/24
                                                   297/216.17
2014/0339866 A1* 11/2014 Olivares ................ B60N 2/24
                                                   297/216.17

* cited by examiner

| Profile | Energy Absorbing Member | Work Increment[1] | Energy for Each Energy Absorber[1] |
|---|---|---|---|
| P1 | 5 | 8937 | T5 = 8937 |
| P2 | 5+1 | 3185 | T1 = 3185 |
| P3 | 5+2 | 3185 | T2 = 6370 |
| P4 | 5+1+2 | 3185 | |
| P5 | 5+3 | 3185 | T3 = 12740 |
| P6 | 5+1+3 | 3185 | |
| P7 | 5+2+3 | 3185 | |
| P8 | 5+1+2+3 | 3185 | |
| P9 | 5+4 | 3185 | T4 = 25480 |
| P10 | 5+1+4 | 3185 | |
| P11 | 5+2+4 | 3185 | |
| P12 | 5+1+2+4 | 3185 | |
| P13 | 5+3+4 | 3185 | |
| P14 | 5+1+3+4 | 3185 | |
| P15 | 5+2+3+4 | 3185 | |
| P16 | 5+1+2+3+4 | 3185 | |

[1] Units of inch-pounds

FIG. 3

STRUCTURE AND METHOD FOR PROTECTING A PASSENGER DURING A CRASH

BACKGROUND OF THE INVENTION

The passenger or occupant seated in a vehicle and particularly a helicopter can be subjected to a combination of forces during a crash. If the occupant is appropriately restrained in a seat, the forces generally acting horizontally (i.e., x and y-axes) are typically considered survivable. However, the forces acting substantially vertically (i.e., z-axis) or along the spine of the occupant can produce significant injuries. Injuries to the spine and particularly to the lumbar region can potentially result in paraplegia or death. To mitigate such injuries, energy absorbing seats are generally used in helicopters, wherein the portion of the seat supporting the occupant is allowed to move or travel by the occupant's inertial loading during impact. The movement of the seat is referred to as stroking and its movement, or stroke, is resisted by the force/s applied by Energy Absorbers (EAs), elongating the stopping distance while absorbing crash energy and reducing the loads imposed on the occupant. The energy absorbers are made to absorb as much energy as possible at loads that are survivable but which stop the seat and occupant before contact with the floor of the vehicle. If the energy absorbing capacity of the EAs are exceeded, the seat and occupant will not stop stroking before reaching it stroking limits in which case it "bottoms out" imposing a sudden impact load on the occupant which can overstress the already stressed spine producing a facture.

The stroking of helicopter seats has been achieved in the past by EAs using a constant force-displacement (stroke) characteristic (See generally, Desjardins, S. P. "The Evolution of Energy Absorption Systems for Crashworthy Helicopter Seats," Journal of the American Helicopter Society (2005). These EAs were called Fixed Load Energy Absorbers (FLEAs). The FLEA method attempts to protect the universe of occupants by providing energy absorbers that stroke at a determined by multiplying the mass of the stroking part of the seat plus the seat-supported mass of a reference occupant by a constant factor expressed in G's. The factor was established as producing a safe deceleration force for a 50th percentile male of the military occupant population. These energy absorbers when stroked completely will absorb the same amount of energy for all occupants regardless of weight since they stroke at the given design force. Consequently, the FLEA is most effective for an occupant having a weight approaching that of the reference occupant. However, the FLEA performance diminishes as the occupant's weight diverges from the weight of the reference occupant. For example, with energy absorbers designed for the 50th percentile occupant, a lighter occupant is generally exposed to greater deceleration than a heavier occupant, because the stroking force of the EA is sized for the mass of the 50th percentile reference occupant and not that of the lighter occupant. This means that the lighter occupant will stroke at a higher acceleration (G) than the heavier occupant. On the other hand, an occupant heavier than the 50th percentile weight can be substantially more at risk because his increased mass will produce stroking at lower G's which means that the seat must stroke further to absorb the additional energy produced by the increased mass of the heavier occupant. That force is generally less than a tolerable for the heavier occupant and the longer stroke results in increased risk of exceeding the available stroke and impacting the floor under the seat. The maximum forces created by impact with the floor or any fixed structure in the path of the seat while stroking can be substantial as it imposes a sudden impact load.

Moreover, the state-of-the-art has always been to minimize time and EA stroke to reach maximum load (EA force) or, in other words, to maximize the rate of onset. (As used herein, the word "force" is generally used to describe the force required to elongate or "stroke" the energy absorbers; whereas, the word "load" is used to describe the load in the spine which is contributing to the force being reacted by the energy absorbers.) The approach of maximizing the rate of onset was established to maximize the energy under the EA force-time curve. (Given a maximum stroke distance, the maximum energy that can be absorbed ((area under the curve of EA force vs stroke)) is produced by a rectangular shape.) This suddenly-applied impact loading approach, however, created dynamic overshoot, a phenomenon caused by the compressibility of the human occupant's spine.

Because the human spine is compressible, there is an inherent delay between when the EA begins to apply a force to decelerate the occupant and the time the occupant's spine has compressed to support the load. As with any damped spring-mass system, if the period of the applied load from the EA to the occupant's spine is too short, the loading of the occupant's spine will lag the input producing peak loads that exceed the applied force of the EA, leading to potential injury. This phenomenon is called dynamic overshoot. The prior art solution to the problem of dynamic overshoot, was simply to lower the entire force setting on the EAs to limit spinal loading to tolerable magnitudes. This resulted in a significant reduction in efficiency of the EA. Researchers also tried to solve the problem created by dynamic overshoot by reducing the force produced by the EAs after the initial onset of loading, creating a "notch" in the EA force versus stroke curve. The timing of this application, however, occurs too late in the event to solve the problem of dynamic overshoot as the occupant response lags initiation of loading.

To overcome the inability of a FLEA to be adjusted for different occupant weights, the Variable Load Energy Absorber (VLEA) was developed. The VLEA is essentially a FLEA in which the EA stroking force can be manually adjusted to a more appropriate level to account for the actual weight of the occupant, i.e. higher EA forces for heavier occupants and lower forces for the lighter occupants. The disadvantage common to both the FLEA and the VLEA is the dynamic overshoot during the initial portion of the deceleration pulse. The stroking force of the EAs must be set low enough to protect the occupant's spine during the initial onset of the pulse resulting in a reduced capacity to absorb energy later in the stroke after the dynamic overshoot has subsided. This is because once the force is set it remains constant at that level during the complete stroke producing spinal loads during the latter parts of the stroke that are significantly lower than would be tolerable.

To mitigate the effects of the dynamic overshoot, while increasing the efficiency of the EA, the Fixed Profile Energy Absorber (FPEA) was developed. The FPEA method provides a decelerating force on the occupant that varies with the seat stroke. It is important to note that the force varies with stroke, not with real time. The variation in force with stroke is produced by an EA mechanism that is designed to produce a specific force vs stroke characteristic that produces lower EA forces initially to limit the dynamic overshoot forces to the tolerable range followed by a higher force versus stroke characteristic later in the seat stroke. This results in a more efficient stroke as the forces decelerating the occupant are always closer to the occupant's tolerance level meaning that more energy is being absorbed at tolerable levels. Test data verifies the improved efficiency of the FPEA characteristic over the constant force characteristics used in all FLEAs and VPEAs. The FPEA, however, like the FLEA is not adjustable for occupant weight and, therefore, when stroked completely will absorb the same total energy irrespective of the occupant's weight.

The, FLEA, VLEA and FPEA methods all provide limited protection for a military seeking greater diversity in personnel. This diversity has resulted in a population that includes an increasing number of female soldiers. For at least this reason, the range of body size and the disparity of weight of the soldier in helicopters has increased. Further, a new generation of crashworthy technology including improved micro-electromechanical (MEMS) sensors and semiconductor electronic devices can provide greater speed and accuracy in determining an incipient crash. Employing new technology is necessary to provide optimal safety and survivability to occupants having a wide range of weight and size. The, FLEA, VLEA and FPEA methods are lacking for not employing the new generation of crashworthiness technology. The FLEA, VLEA and FPEA methods do not individually and automatically measure and correct the EA setting for the occupant's weight and the FLEA and FPEA cannot be adjusted for the occupant's weight even if the data were available. None provide any compensation to the forces needed to safely decelerate occupants over a broad assortment of crash environments.

VLEAs are provided with manual adjustments to enable an occupant to adjust the EA stroking force for occupant weight. The FPEA instead depends on the shape of the profile itself to protect the light occupant with the low EA force being applied over the beginning few inches of stroke followed by the next few inches at intermediate force to protect the bulk of the user population and with the remaining few inches at higher forces to protect the heavier occupants. The design of the FPEA, is quite inefficient as most of its available stroke is used in decelerating heavier occupants using much lower forces than are tolerable; however, it can be more efficient than the FLEA which is limited by a constant EA force that must be low enough to protect the lighter occupants which means it never operates at the optimum stroking force for the heavier occupants.

Other technologies attempt to solve the problems associated with limiting the forces imposed on the human to within tolerable magnitudes by measuring the response of the body to the loading and adjusting the EA forces in real time, as opposed to providing loading profiles that are predetermined and selectable either by the occupant prior to flight or by a vehicle-borne sensing and control system. One of the problems associated with systems using real time measurements to adjust the EA applied force is determining what parameter to measure for use in controlling the applied EA force. It is not possible to measure spinal loads in a living occupant and, consequently, a secondary measurement indicative of spinal load must be used. The usual approach for making this type of approximation is a measurement of seat accelerations; however, seat acceleration is not an accurate indicator of spinal load. Another problem associated with these types of systems is created by the very short time available to make the measurement, convert that information into a correction and then in making the correction in time to affect the immediate loading of the occupant. The total time of the Government-specified vertical crash pulse for helicopters is 0.043 to 0.087 seconds depending on seat location in the vehicle and these systems must make the corrections instantaneously during that period to correct an effect that occurred previously. It must also be remembered that spinal load is a result of a human body's response to previously applied loading and therefore lags the imposition of the causative loading. Since the correlation between those two parameters and spinal load has not been established, the technology has not been proven.

Hence, there is a need for a method to absorb a portion of the kinetic energy of any occupant of a crashing aircraft using humanly tolerable forces regardless of weight and as a function of the specific crash characteristics. Such a method would use the most efficient force vs stroke profile possible, eliminating the effects of dynamic overshoot, and accounting for the occupant's weight and decelerating the occupant using the lowest stroking forces possible while using the entire available stroke to absorb the necessary energy to preclude the stroking portion of the seat from contacting the floor of the vehicle. It would also provide a humanly survivable environment in the most severe crash possible. This would also mean eliminating the effects of dynamic overshoot while using a profile providing the maximum tolerable loading over the entire available seat stroke.

SUMMARY OF THE INVENTION

The present invention solves the foregoing problem by providing a Selectable Profile Energy Absorber (SPEA) in which a plurality of fixed profile energy absorbers can be selectively engaged to provide a tailored EA composite profile adapted to the occupant's weight and anticipated crash environment. The SPEA system uses flight parameters from which the appropriate profile is selected from a look-up table, or other technique, prior to the crash. The available profiles have been optimized through testing to provide the most efficient stroke for that occupant and that projected crash. In cases where the aircraft born sensors are not available to predict the crash, the profile selection made initially by the occupant is the optimum for his/her weight when subjected to the Government-specified crash pulse. The SPEA enables greatly improved efficiency by providing an optimally designed profile for each occupant weight range selected. This capability of the SPEA enables all occupants to be decelerated by near optimal forces applied over their entire stroke distance.

More specifically, the invention describes an approach for increasing the efficiency of such devices by enabling the selection of the most efficient energy absorber ("EA") force-stroke profile to be selected, either by the passenger prior to flight or an aircraft-borne selection system that selects the most efficient EA force-stroke profile for the specific crash to be experienced. The aircraft borne sensing system incorporates an algorithm that predicts the crash and the crash environments from sensing systems mounted on the aircraft that monitor aircraft performance while relating it to altitude and distance from terrain. Using the aircraft capabilities, programmed into the algorithm together with the flight information, (altitude, velocity in all three axes, etc.) the algorithm predicts not only that a crash cannot be avoided, but also the crash environment which is then used to select the most efficient profile for that specific crash and seat occupant. The profiles are selected from a group of unique profiles that when selected in various combinations yield the composite profile that is the most efficient for that occupant and that crash. The shapes of the profiles were developed to minimize the phenomena of dynamic overshoot. Reducing the magnitude of dynamic overshoot, enables the entire force-stroke profile to be raised without increasing the probability of overloading the seat occupant's spine which produces an increase in efficiency of the energy absorbing process.

In another general aspect of the invention, a seat system structure of a vehicle is provided and includes a first portion, and a second portion having a seat for supporting an occupant. The invention further includes a plurality of energy absorbers for absorbing energy of the second portion and extending between the first and second portions such that any combination of the plurality of energy absorbers provides a discrete force vs stroke energy absorbing profile. In the illustrative embodiment, the energy absorbers each comprise a Fixed Profile Energy Absorber, however, FLEA or other energy absorbers may be used without departing from the scope of the invention.

Further, the invention includes a port for receiving physical parameters from an aircraft algorithm predicting that a crash will occur and providing the impact parameters needed to enable selection of a discrete composite profile for that specific seat and occupant in that specific crash. The method further includes a seat system controller that detects physical parameters acting on the seat system, the sensor input from the aircraft, the prediction of the crash from the aircraft, calculates the energy to be absorbed using the detected physical parameters and flight status information and automatically directs the selection and physical attachment of the selected individual EA devices that will provide the discrete composite EA profile needed to safely decelerate the occupant again using the lowest loading possible and all of the stroke available. Selecting the lowest discrete force vs stroke profile that absorbs an amount of energy just greater than calculated provides the lowest loading possible while absorbing the necessary energy and is thus the most efficient EA possible.

In yet another general aspect of the invention, a method of attenuating energy on a portion of a seat system of a vehicle is provided and includes a first portion and a second portion having a seat for supporting an occupant. A plurality of energy absorbers extends between the first and second portions for absorbing energy on the second portion of the seat system such that any combination of the plurality of energy absorbers provides a discrete energy absorption force-stroke profile. Further, the EA force vs stroke profiles are configured to first elongate the rate of onset to minimize or eliminate the dynamic overshoot encountered with systems using a rapid rate of onset. The profiles are further empirically shaped to minimize the initial onset and then to increase the applied force along a force-stroke profile that allows higher tolerable loading of the lumbar spine later in the stroke to maximize the energy absorbed over the complete system stroke. This is accomplished effectively by the shape of the force-stroke EA contours which lower the initial loading of the spine allowing higher loading over most of the remaining stroke with all loads below the tolerance limit of the spine. This technology also enables maximizing the severity of the survivable crash through the increased efficiency of the energy absorbing stroke.

BRIEF DESCRIPTION OF THE DRAWINGS

The present invention will be better understood from a reading of the following detailed description, taken in conjunction, with the accompanying drawing figures, in which like reference numbers designate like elements and in which:

FIG. 3 is a table illustrating increments of energy absorbed by a base energy absorber profile combined with possible combinations of other profiles;

DETAILED DESCRIPTION

Figure 1:
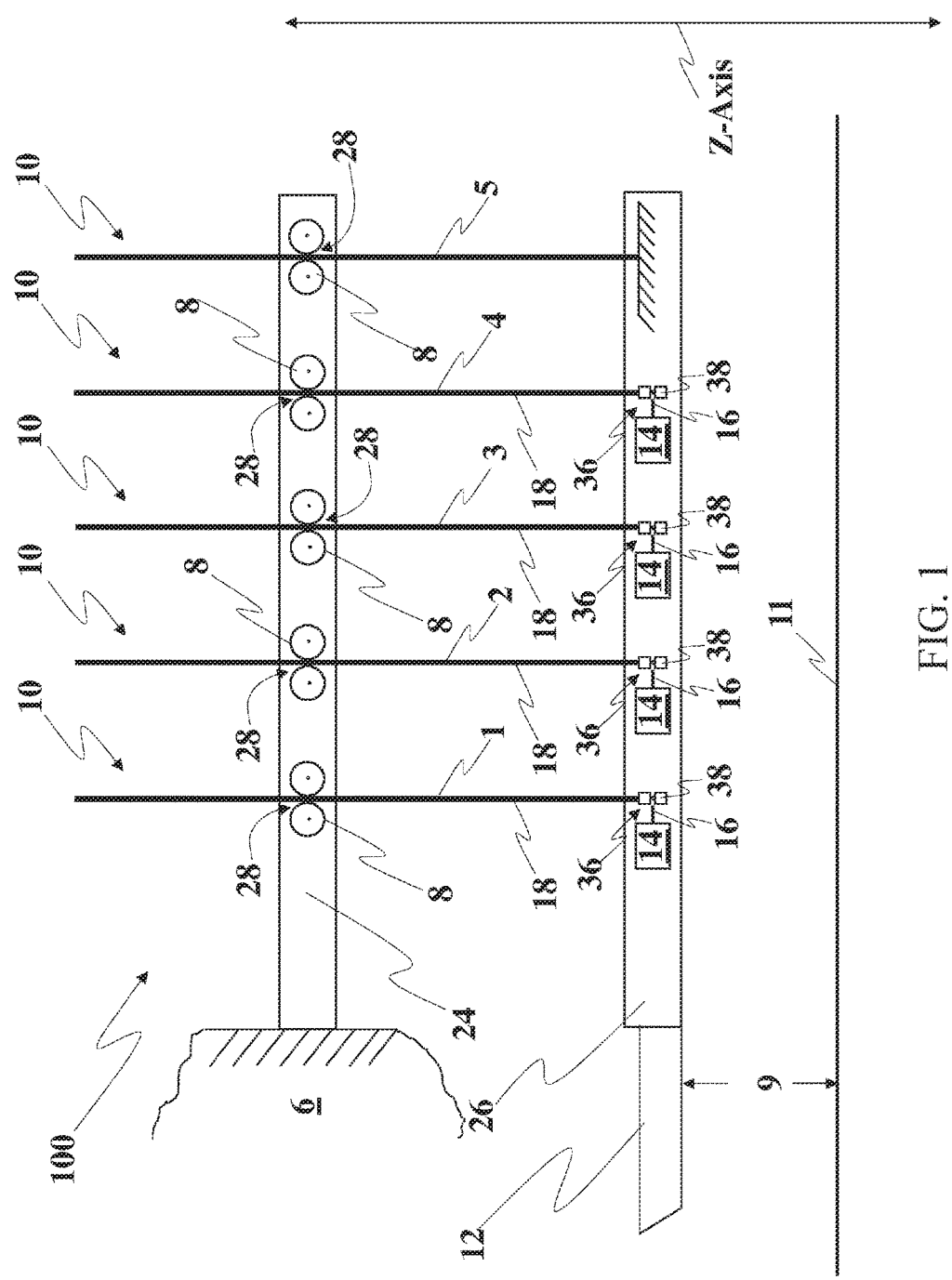
FIG. 1 is a schematic diagram depicting a seat system for decelerating an occupant.
Figure 2:
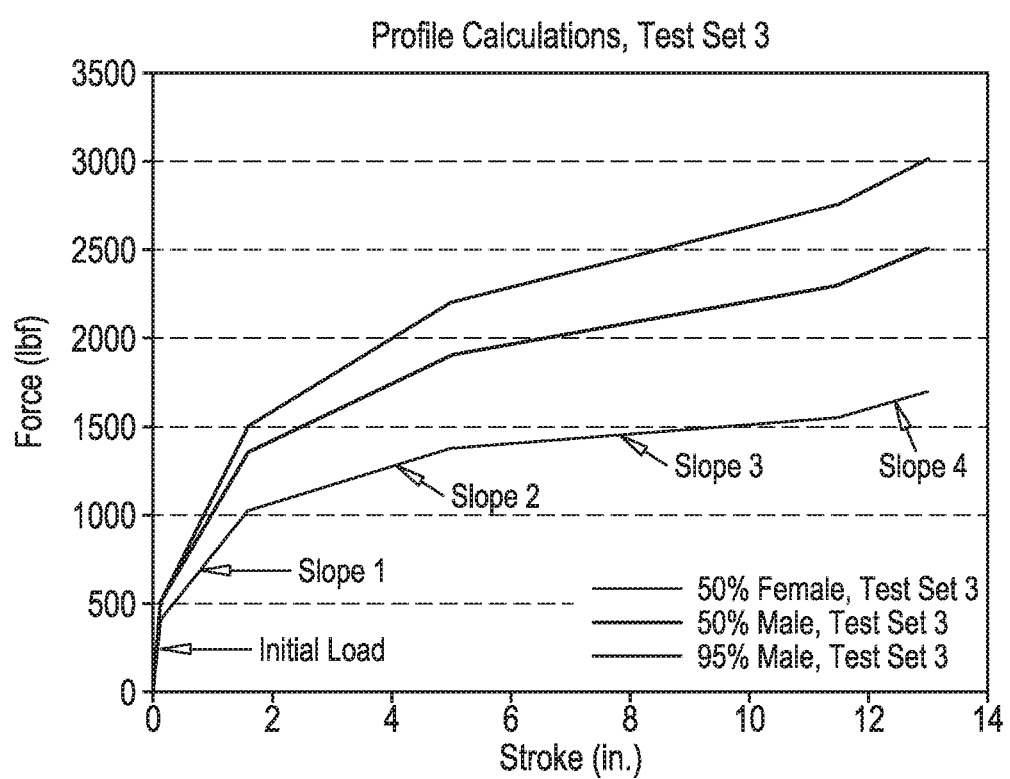
FIG. 2 is a graph showing the plots of three distinct empirically developed Force versus Stroke profiles.
Figure 4:
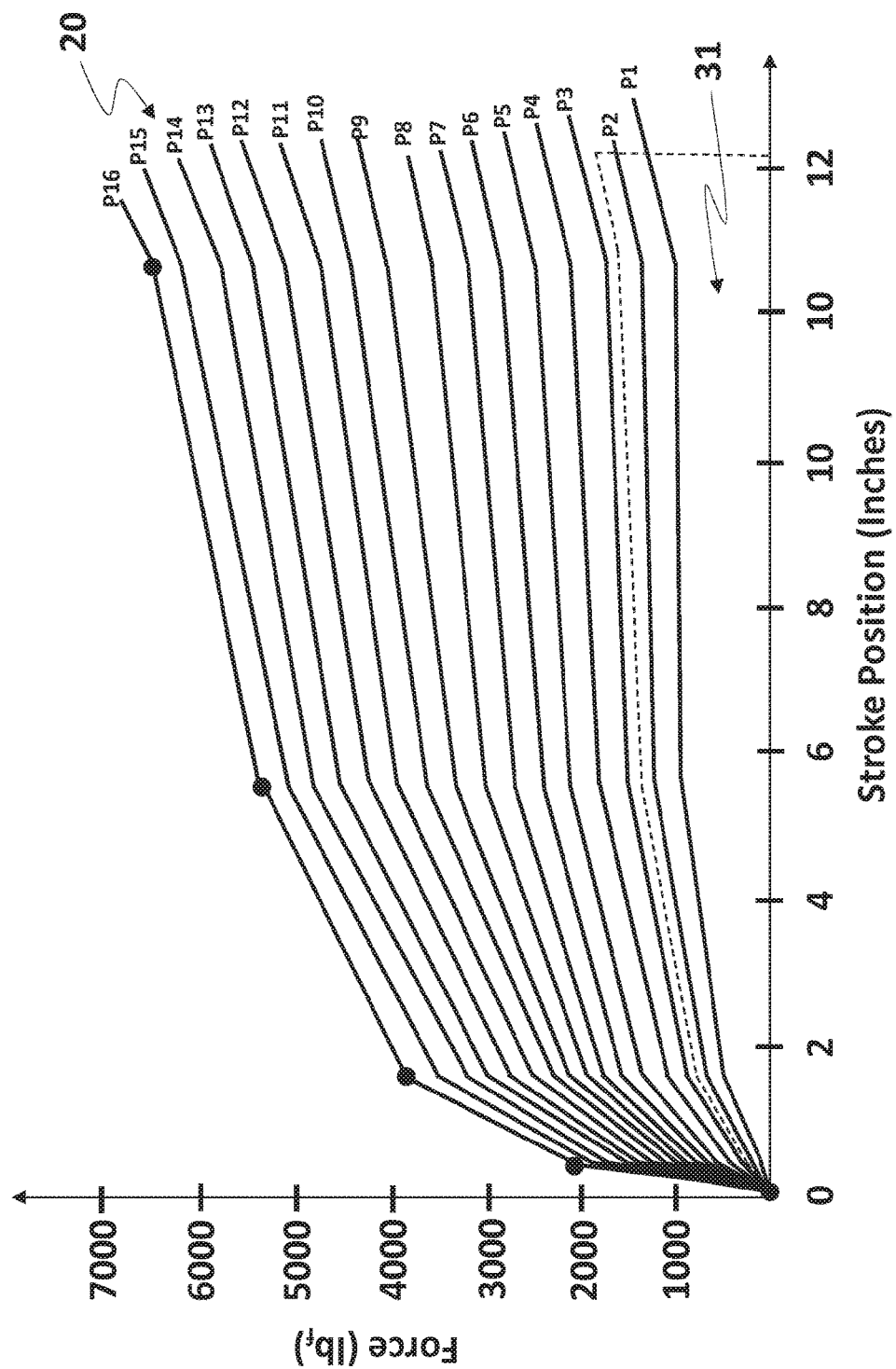
FIG. 4 is a graph illustrating the possible discrete energy absorber profiles obtained by combining the base energy absorber with combinations of the other energy absorber profiles.

Generally, the invention provides a method to configure and/or reconfigure the connection of energy absorbers between two portions of a helicopter seat system for limiting crash deceleration forces being exerted on an occupant (FIG. 1). It also provides definition of new "low onset" force vs stroke profiles for energy absorbers which enable major improvements in efficiency. Use of these two methodologies in combination enable a major increase in the severity of survivable crashes of vehicles which impose large forces in a direction parallel to the spine (Z) as is typical in helicopter crashes. The two portions of the seat system include a first portion that is attached or coupled to the aircraft and a movable second portion for containing the occupant. On impact, the second portion of the seat system is made to move or stroke generally along a z-axis to reduce the deceleration loading on the occupant. The stroking is controlled by at least one energy absorber of a plurality of energy absorbers provided in the system for connecting the first and second portions of the seat system. Each of these energy absorbers uses a predetermined force vs stroke profile specifically developed to maximize the efficiency of the available stroke distance available in a helicopter. The profiles were developed empirically for the 3 basic size ranges of humans for which Articulated Test Devices ("ATDs" i.e. test dummies) are available (FIG. 2). The plurality of energy absorbers provides the ability to protect a wide range of body weights and crash severities. Note that it is possible, although perhaps not practical, to obtain 16 different composite profiles with just 5 individual EAs (FIGS. 3 & 4). The unique energy absorber profiles enable maximizing the efficiency of the system while minimizing trauma to the body. In particular, each segment of each profile of each energy absorber provides a distinct force vs stroke relationship (slope), to maximize the energy absorbed while limiting the occupant's rate of deceleration to tolerable levels. The initial portion of each profile has been uniquely formed to reduce the rate of onset which lengthens the time and stroke distance involved in the force build-up. The more abrupt this build-up, the greater the dynamic overshoot which leads to high loading initially on the occupant.

Figure 5:
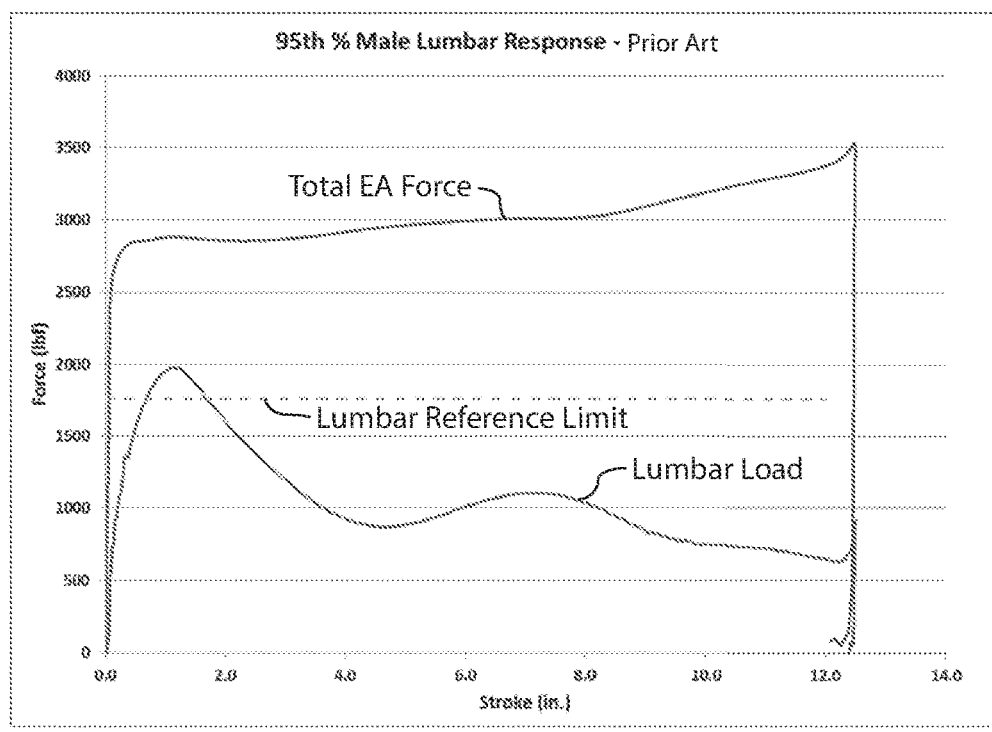
FIG. 5 is a graph of test data illustrating dynamic overshoot and its effect on efficiency of the entire stroke for a $95^{th}$ percentile male.

As noted previously, in theory a constant-force EA will absorb the most energy for a given maximum force and stroke length (the area under the curve is maximized when the force is constant). In practice, however, use of prior art EA force-stroke relationship necessitates downward adjustments in EA force to lower the high overshoot loads. This leads to lower efficiency and a reduction in the survival envelope. FIG. 5 shows an example of the process. The curves are results from drop tests using a 95th Percentile Male Hybrid III ATD. The dotted line represents the lumbar spine tolerance limit in pounds-force for that seat occupant. The lower curve is the force measured in the lumbar spine of the ATD and the upper curve is the total measured EA force, (approximating a maximum energy constant force) applied in that test. Note that the constant force EA causes a huge dynamic overshoot spike in lumbar spinal load (approximately a factor of 2.1, 2000 lb. vs 950 lb.) measured initially during the pulse onset followed by an oscillating but steady decay of load as the stroke continues, even though the applied EA force is relatively constant, rising slightly, for the first 8 inches of stroke, and then actually rising more rapidly to just over 3500 lb. at the end of stroke. The area between the lower curve, lumbar load, and the dotted line represents energy that is not being absorbed by this EA because the EA load has been set low to limit the dynamic overshoot to tolerable levels. (It can be seen that the EA force was not set quite as low as it could have been as the maximum measured lumbar spinal load exceeded the 1750 lb. lumbar load limit by approximately 250 lb.) It can also be seen that the area above the lower curve and below the dotted line is roughly equal to the area under the lower curve meaning that this energy absorbing process is only about 50% efficient.

With reference to the drawing figures and in particular FIG. 5, the EA in FIG. 5 was designed to begin stroking at the crash force specified by the Government for a 95$^{th}$ percentile male occupant (soldier). That force was calculated by multiplying the effective weight of the clothed 95$^{th}$ percentile male occupant plus the weight of the stroking portion of the seat by the crash load factor of 14.5 G, yielding a force that allowed the seat to begin stroking at around 2800 lb. (FIG. 5). Note the very steep rate of onset all the way up to the crash stroking force and the resultant high overshoot in lumbar spine load.

Figure 6:
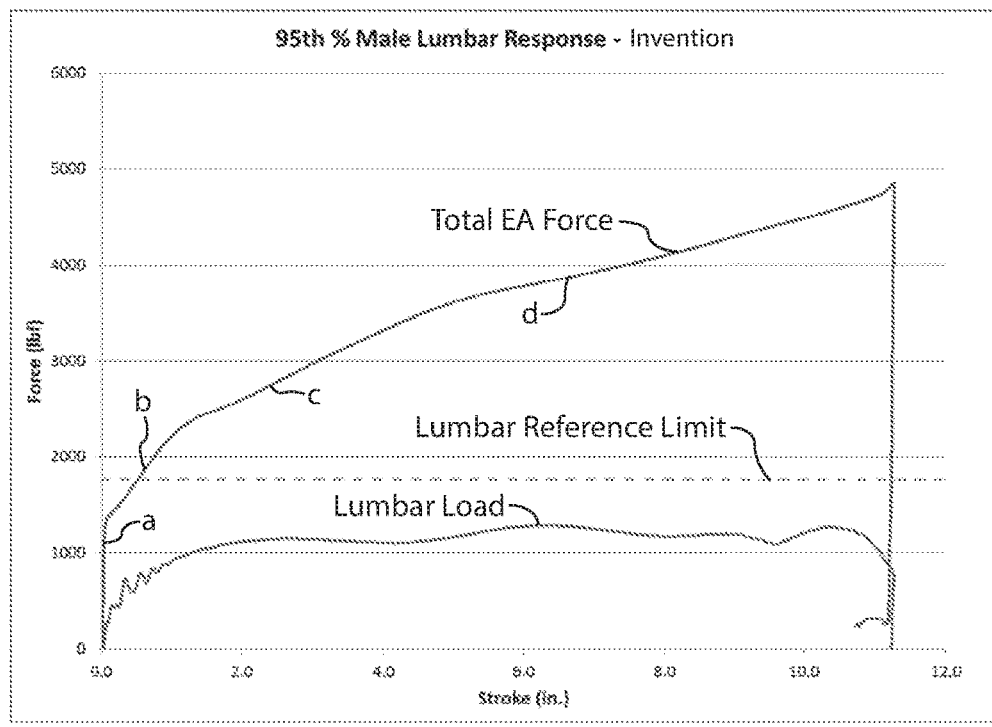
FIG. 6 is a graph of test data showing the effect on dynamic overshoot of decreasing the rate of loading onset for a $95^{th}$ percentile male.

What the inventors of the present invention discovered is that if the initial onset of the EA force is "frequency matched" to the dynamic response of the human spine, the dynamic overshoot can be substantially reduced, which leads to a significant increase in the total energy absorbed and an increase in the survival envelope. As used herein, "frequency matched" means that the period of the initial onset of the EA force is made sufficiently long to avoid a dynamic overshoot in the occupant's lumbar spine of more than about 4 G's. The effect of frequency matching the EA force is shown in FIG. 6. FIG. 6 shows the lumbar response using the frequency matched EA force for a 95th percentile ATD. The dotted line represents the lumbar spine tolerance limit in pounds-force for that seat occupant. The lower curve is the load measured in the lumbar spine of the ATD and the upper curve is the total measured EA force.

As shown in FIG. 6, with a frequency matched EA force, the initial EA force rises sharply to around 1300 lb. (slope "a" in FIG. 6). This steep rise is associated with the effective elastic modulus of the seat structure itself and any backlash in the seat structure, which generally occurs within the first 0.001-0.002 inch of seat stroke, preferably within the first 0.100 inch and certainly no more than 1 inch of seat stroke, and is typically limited to less than 2-4 G's of acceleration associated with a specified flight load multiplied by the weight of the heaviest occupant and stroking portion of the seat (necessary to ensure the seat does not stroke during normal operation and may be higher, if vibration is a contributing factor).

Once the elastic modulus of the seat and any backlash has been taken up the slope of the total EA force is reduced to a value that is less than the maximum that can be achieved to reach the desired load level (slope "b" in FIG. 6). In the illustrative embodiment, once the EA force (initial load) reaches approximately 1300 lb., the seat begins to stroke the EA. The force reaches 2450 lb. while stroking about 1.5 in. producing an EA slope of approximately 767 lb./in (slope b). The force then reaches approximately 3650 lb. at 5 in. of stroke for a segment slope of 343 lb./in (slope c). It then climbs to 4800 lb. at just over 11 inches of stroke yielding a profile segment slope of 192 lb./in (slope d). This is in stark contrast to the prior art EA in which the EA force reaches approximately 2800 lb. in less than $\frac{1}{16}$ inch (an EA slope of over 44,000 lb./in) then maintains relatively constant force (rising only slightly—by approximately 200 lb., over 8 inches of stroke). Note that with the new profile, approximately the same amount of energy has been absorbed in less stroke (~11 inches vs ~12 inches) while the maximum spinal load has been reduced from 2000 lb. to roughly 1400 lb., a reduction of 30 percent.

Although reducing the rate of onset of the EA force is counterintuitive from the theory that the maximum energy is absorbed if the EA force is maintained at a sustained fixed level over the entire stroke, because the reduced onset is frequency matched to the human spine, the Dynamic Overshoot is essentially zero for this, the heavier, 95$^{th}$ percentile occupant. (The reduction in Dynamic Overshoot is even more pronounced in the lighter occupants, but does not get to zero.) This enables the total area under the EA force curve to be increased without moving the measured spinal load closer to the tolerance limit. Also, note that, although the EA load curve is not a square wave, the lumbar load vs stroke response is essentially a constant square wave response. Thus, the use of a frequency matched, low onset EA force with a decreasing slope thereafter actually results in maximizing the area under the lumbar load-stroke curve. This shape of the spinal load-stroke curve represents the shape spinal load vs stroke that provides the maximum energy that can be safely absorbed by such a system. Note too that the EA force could be raised, absorbing even more energy while limiting the lumbar load to values well below the lumbar load tolerance limit.

Figure 7:
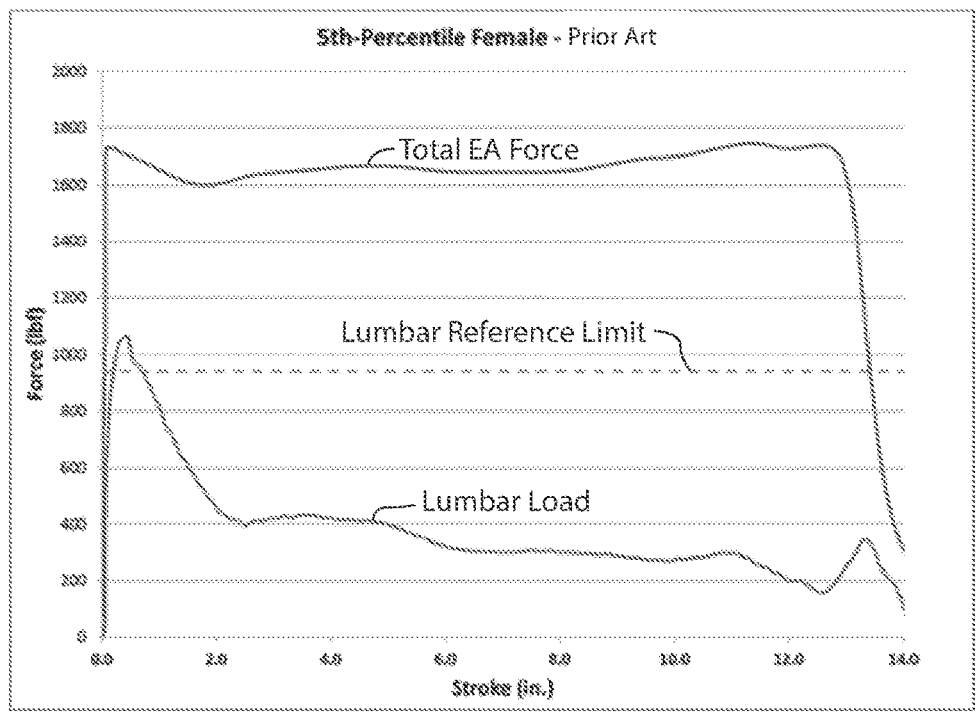
FIG. 7 is a graph of test data illustrating dynamic overshoot and its effect on the efficiency of the entire stroke for a $5^{th}$ percentile female.

The reduced rate of onset solves the dynamic overshoot problem and enables more efficient use of the available stroke distance which is limited in any vehicle and especially in helicopters. It should also be noted that the forces involved in defining the profiles may be increased or decreased which essentially moves the profiles higher or lower on the EA force vs stroke plot. These manipulations of profiles are useful in accounting for variations in weight being supported by the EA system during optimization of the EA system. Variations in weight are unique to an application and are defined and specified by the user. They are specified to satisfy specific and unique requirements. For example, the military user typically specifies an occupant weight range which includes the 5$^{th}$ percentile female through the 95$^{th}$ percentile male. Aerospace applications typically require a range which includes the first percentile female through the 99$^{th}$ percentile male. Additional weight variations result from different seat designs, for example armored vs unarmored, as well as required occupant- and seat-supported equipment. These two considerations can, in some applications, weigh multiples of the occupant weight (space applications). Profiles may also be modified to be compatible with stroke limitations. These limitations occur in aircraft/helicopters but are especially important in aerospace applications where space in the module is extremely limited. These modifications can be made without degrading the performance of the invention by following the rules explained in this patent. The frequency matched, reduced rate of onset is produced by contouring the roller seat in the EA tube as shown in FIG. 7. The energy absorbing stroke is created by drawing a metal tube through two diametrically opposed rollers which progressively crush the tube which has been machined to provide an increasing wall thickness with length. The increasing force vs stroke profile is created by the increased force necessary to crush the thicker tube wall. The rollers require a divot to nest in snugly, and a ridge to support the seat and occupant during normal operation which must be precisely shaped to produce the desired force vs stroke profile needed to reduce dynamic overshoot during crash loading to (FIG. 7).

The shape of the profile beyond the initial segment (Initial load and Slope 1 in FIG. 2) is further controlled as a function of stroke. It is designed to build the EA load up to a higher level, coordinating with and taking advantage of the damping of the response of the system to the initial shock. As the peaks and valleys in the deceleration oscillation decay, the EA force is increased to increase the lumbar loads moving them closer to the desired tolerable occupant loading levels. Thus, the use of the profile results in the most efficient use of the available stroke distance, because the lumbar loading of the occupant is retained closer to the maximum tolerable level for most of the event. Compare FIG. 5 with FIG. 6. This concept can be used to provide tolerable deceleration of the occupant in the most severe crash possible, or where crash sensing is available, selecting the composite profile that provides the lowest composite force level that will absorb all the necessary energy and complete the stroke using almost all of the available stroke distance. This latter capability, using almost all of the stroke available, provides the least trauma possible for each specific occupant in each specific crash. Moreover, if crash sensors are available and the crash severity is predicted to be less than normal flight loads, the SPEA can be programmed to begin stroking at less than the specified flight load multiplied by the weight of the heaviest occupant. This can provide an even softer landing for light occupants.

The specific energy absorbers used in the development of this technology were constructed of aluminum tubes (72) machined to provide increasing wall thickness sized to provide the increasing force vs stroke characteristic apparent in the previous profiles when crushed. Rollers (74, 76) were seated in a pre-formed divot (78) near the end of the tube having the thinnest wall (FIG. 7). The rollers crush the tube (72) as it is drawn through the rollers (74, 76) while being stroked. The softening of the initial build up in force was accomplished by elongating the divot (78) formed into the tube in which the rollers (74, 76) were seated and starting the reduction in slope of the EA force vs stroke immediately after reaching the force needed to support the stroking part of the seat and occupant during normal operation. The elongation in the divot (78) allows a more gradual buildup of load upon impact and produces a large reduction in dynamic overshoot.

The type of energy absorber or the method of elongating the rate of buildup of deceleration or force should not be a limitation of the present invention. The incorporation of any method or approach for softening, elongating, or extending the buildup of force and G's that reduces the magnitude of dynamic overshoot during the initial phase of the impact is the technology being claimed.

Further, the shapes of the profiles were empirically developed, are unique and are claimed. The method of combining multiple profiles to create the needed discreet composite profile is also claimed. Each profile is unique and each combination of profiles to produce a discrete composite profile is unique. Consequently, the availability of multiple EAs from which to select allows a unique discreet composite profile created to match each occupant/crash scenario almost precisely is claimed. The degree of precision in matching a desired profile is a function of how may individual profiles are available to choose from. A discrete composite profile is comprised of any combination of the individual profiles included in the family of energy absorbers in any selectable energy absorbing system with each combination covering a range of occupant weights and/or crash severities.

Real-time signals can be used to convey information or physical parameters prior to an impending crash for determining the needed magnitude of crash energy to be absorbed in order to minimize deceleration (G's) and thus trauma to the occupant. The profile needed to absorb the crash energy involved in a specific crash can then be calculated enabling the specific composite profile to be selected. The physical parameters can contain information such as occupant's weight, aircraft velocity, attitude of the aircraft, distance to the ground, angle of incidence and the like. It is important to note that the velocity of the vehicle (in this case a helicopter) relative to the ground be known as well as the vehicle attitude as the velocity of the occupant and seat in the Z direction relative to the seat and occupant coordinates must be determined to enable selection of the correct composite profile.

The physical parameters in the form of signals from sensors located on an aircraft are received via a port on the seat system having a controller. Just prior to impact, the controller calculates the energy that will need to be absorbed to protect the occupant (the "calculated energy"). From all the combinations of discrete energy absorbing profiles that can be generated by the combinations of energy absorbers, the controller selects a discrete composite profile based on the selection criteria. The selection criteria include: First, the selected discrete composite profile must limit the stroking distance so that the seat does not use more than the maximum stoke (which would result in the seat hitting a hard stop). Second, that the selected discrete composite profile must absorb the least amount of energy that is greater than the calculated energy, thus maximizing stroke distance and minimizing spinal loading. For very severe crashes, the lumbar loading will be maximized while staying within tolerable limits. This approach will enable occupant protection in more severe environments than are now survivable. In less severe crash environments, the selected composite profile will still make use of the entire stroke distance meaning that the average forces can be significantly lower than survivable leading to less trauma to the occupant than provided by a preprogrammed system tuned for a specified design requirement.

After the controller selects a discrete profile, the controller provides an output signal for selecting the particular combination of energy absorbers that create the selected discrete composite profile. Finally, the chosen energy absorbers are selected and connected to the first and second portions of the seat system.

FIG. 1 is a schematic diagram depicting a substantial portion of a seat system 100 including an upper portion 24 connected to a vehicle 6, such as an aircraft, and a movable lower portion 26. The movement of the lower portion 26 is called stroking and generally occurs along a z-axis. The seat system 100 of FIG. 1 protects an occupant during a crash and includes a plurality of energy absorbers 28. In one embodiment, the energy absorber 28 can include a die 8, as depicted in FIG. 1 or rollers (74, 76) as discussed above, contacting an energy absorbing member 10 (which can be a tube 72 as discussed above) and extending between the upper 24 and lower 26 portions. The energy absorbing members 10 can serve to attenuate loads and absorb energy and can include a range of structures including metal tubes, metal strips, wire and the like. The embodiment of the energy absorber 28 as only a combination of dies 8 and energy absorbing members 10 should not be considered a limitation of the present invention. A typical system will typically use at least 4 of the individual energy absorbers to maximize usefulness of the custom designed coverage thereby offered; however, other combinations may be used to satisfy requirements. Counting from left to right in FIG. 1, the energy absorbing members 10 are respectively designated energy absorbing members 1, 2, 3 and 4 and called incremental energy absorbing members 18. As shown in FIG. 1, the lower portion 26 includes a seat 12 for supporting an occupant (not shown) and a plurality of electromechanical devices 14 each having a pin 16, fork, latch, detent or any other mechanical attachment device which can be extended into a drilled, slotted our otherwise prepared end piece 38 disposed on the end of each incremental energy absorbing member 18. The combination of engaging the pin 16 with the slotted end-piece 38 is a structure for connecting the upper 24 and lower 26 portions and is referred to as a latching device 36. Any latching device including cams, pins, self-locking jaws, rotating C sections, etc. may be used. The type of latching or locking device or mechanism should not be a limitation of the present invention. The latching device 36, though shown on the lower portion 26, can be located on the upper portion 24. The location of the latching devices 36 should not be considered a limitation of the present invention.

At least one of the devices is envisioned to be latched/locked at all times; although, other devices may be used to support the seat and occupant during normal use freeing up one more of the EAs for selection or non-selection. Other selected devices with different profiles may be added to produce the desired composite profile. The latching device 36 provides the ability to select at least one particular incremental energy absorbing member 18 during flight or prior to flight upon occupation of the seat 12, thereby connecting any selected incremental energy absorbing member 18 to the lower portion 26 upon activation of any corresponding mechanical device electromechanical or other 14. Flight can be considered any condition where the vehicle 6 is in airspace and not in contact with the ground. The fifth energy absorbing member 10, on the right side as illustrated in FIG. 1, is referred to as a base energy absorbing member 5. The base energy absorbing member 5 can be made up of one or more EAs or other devices which are constantly connected between the upper 24 and lower 26 portions and cannot be selected using any electromechanical or other device 14, unlike the incremental energy absorbing members 18 depicted in FIG. 1.

As illustrated in FIG. 1, the upper portion 24 contains a plurality of energy absorbers 28 with fixed preformed profiles which can be selected individually or in combination with others to produce a plurality of different energy absorbing force-stroke profiles. In one embodiment to mitigate the severity of the crash on the occupant, any one or combination of the plurality of energy absorbers 28 can be used to provide energy absorption acting in a direction to decelerate the occupant at a reduced rate minimizing crash-induced trauma. The energy absorber 28 typically is pre-formed to provide a force that varies with stroking distance 9, not with real time. The mitigation of the deceleration commences at impact as the seat 12 starts stroking. A substantial portion of the crash energy is absorbed by the energy absorbing member 10. In one embodiment, the energy absorbing member 10 can be effectively crushed by the dies 8 during stroking. In other words, a substantial portion of the energy can be absorbed by the crushing of the energy absorbing members 10, which are deformed as in one embodiment as they move through the dies 8. In FIG. 1, the available stroking distance 9 is depicted between the bottom of the seat 12 and floor surface 11 of the vehicle 6 prior to any stroking. To protect the occupant, it is important that the stroking seat 12 does not impact the floor 11 of the vehicle 6 on completion of the stroking. In another embodiment, the metallurgy and wall thickness of each of the energy absorbing members 10 can be made to absorb particular ranges of energy, thereby allowing a user to compensate for a wide range of body weights.

FIG. 2 is a graph depicting three distinct plots A, B and C with the stroking distance in inches along the horizontal axis and the force in pound-force along the vertical axis. The A, B and C plots of FIG. 2 were generated with empirical data gathered from dynamic drop tests using anthropomorphic test devices (ATDs) respectively consisting of light weight (5th percentile female), mid-weight (50th percentile male) and heavy (95th percentile male) occupants. The plots, as shown in FIG. 2, can be referred to as energy absorbing profiles, or force vs stroke profiles. In particular, the energy absorbing profiles of FIG. 2 were used in the development process to determine the distinct profiles (not shown) of the individual energy absorbing members 10 including the base energy absorbing member 5 and the incremental energy absorbing members 18. It is important to note that the individual profiles for the energy absorbing members 10 were developed in order to provide a wide continuous range of profiles that are appropriate for decelerating a generally continuous range of occupant body weights and are not limited to the three particular discrete ATD sizes mentioned above. In one embodiment of the invention, the ability to include a continuous broad range of occupants is accomplished by grouping the base energy absorbing member 5 with up to four incremental energy absorbing members 18. The number of incremental energy absorbing members 18 should not be considered a limitation of the present invention.

FIG. 3 is a table depicting the various combinations of energy absorbers 28 that make up the respective discrete profile 20, which are identified in the first column as P1 through P16. The energy absorbers 28, as discussed above in FIG. 1, can consist of incremental energy absorbing members 18 that include the particular incremental energy absorbing members 1, 2, 3 and 4 and the base energy absorbing member 5. The second column of FIG. 3 shows the particular combinations of the energy absorbers 28 for each discrete profile 20. The third column of FIG. 3 called "Work Increment" depicts the constant incremental energy or work done (3,185 inch-pounds) in stroking combinations of energy absorbers 28 for each respective discrete profile 20. The fourth column of FIG. 3 headed "Energy for Each Energy Absorber" shows the contribution of each incremental energy absorbing member 18. For example, the discrete profile P9 includes the base energy absorbing member T5 and energy absorbing member T4. However, member T4 alone contributes 25,480 inch-pounds of energy absorption. This is 8 times 3,185 inch-pounds, which is the incremental work increment. It is important to note that each incremental energy absorbing member 18 contributes distinct amounts of energy based on multiples of the incremental energy 3,185 inch-pounds. The amount of the incremental energy absorption should not be considered a limitation of the present invention. Since each incremental energy absorbing member 18 contributes distinctly increasing amounts of energy, a broad range of energy absorption can be achieved with the combinations of discrete profiles 20 in order to cover a diverse population of occupants of varying body types in a range of crash severities.

FIG. 4 is a graph depicting 16 discrete profiles 20 with the stroking distance in inches along the horizontal axis and the force in pound-force along the vertical axis. Each discrete profile 20 is depicted as the result of connecting five inflection points located at particular stroking distances (e.g., 0, 0.5, 2.0, 5.0 and 13.0 inches) with straight lines. The respective force at each inflection point of the discrete energy profile 20 is empirically derived and is associated with obtaining and maintaining lumbar loading that is less than the maximum specified tolerable load. The area under each discrete profile 20 represents the energy that can be absorbed by an energy absorber with that force-stroke profile. As illustrated in FIG. 4, the force used for absorbing the crash energy increases with distance stroked. (see FIG. 1). Note that the relationships between force and stroke are not real time dependent, only stroke dependent. From the physical parameters 42 (See FIG. 8), the vertical component of the velocity of an incipient crash, among other information, can be used to determine how much energy is needed to sufficiently limit the stroke to the distance available 9 between the seat 12 and the floor of the vehicle 11. The shape of the profile 20 and its force vs stroke relationship (position on FIG. 4) assures that the deceleration forces imposed on the occupant are tolerable, assuming that the total crash energy is within survivability limits. Further, FIG. 4 depicts absorption energy 31, of each profile 20 which is calculated using physical parameters 42 as discussed in FIG. 8 and FIG. 9 below. The calculation of energy to be absorbed 31 is based on the known laws of engineering mechanics and can include occupant mass and the received physical parameters 42. In FIG. 4, the absorption energy 31 is represented as an area extending from the horizontal axis to the dashed line between profile P2 and P3. As shown in FIG. 4, each grouping of the energy absorbing members 10 provides a discrete energy absorbing Force vs Stroke profile 20 (e.g., P1 through P16). The profile 20 providing the maximum energy absorption consists of using all of the energy absorbers 28 added together. The minimum energy absorption is provided by only using energy absorber 28 having only the base energy absorbing member 5 without attaching any of the incremental energy absorbing members 18. Further, in one embodiment, incremental amounts of energy absorption can be provided from the maximum to the minimum energy absorption by using any one combination of sixteen possible combinations of the energy absorbers 28. Further yet, the selected combination of energy absorber 28 was designed to decelerate the occupant in a distance less than the available stroking distance 9 (see FIG. 1).

Figure 8:
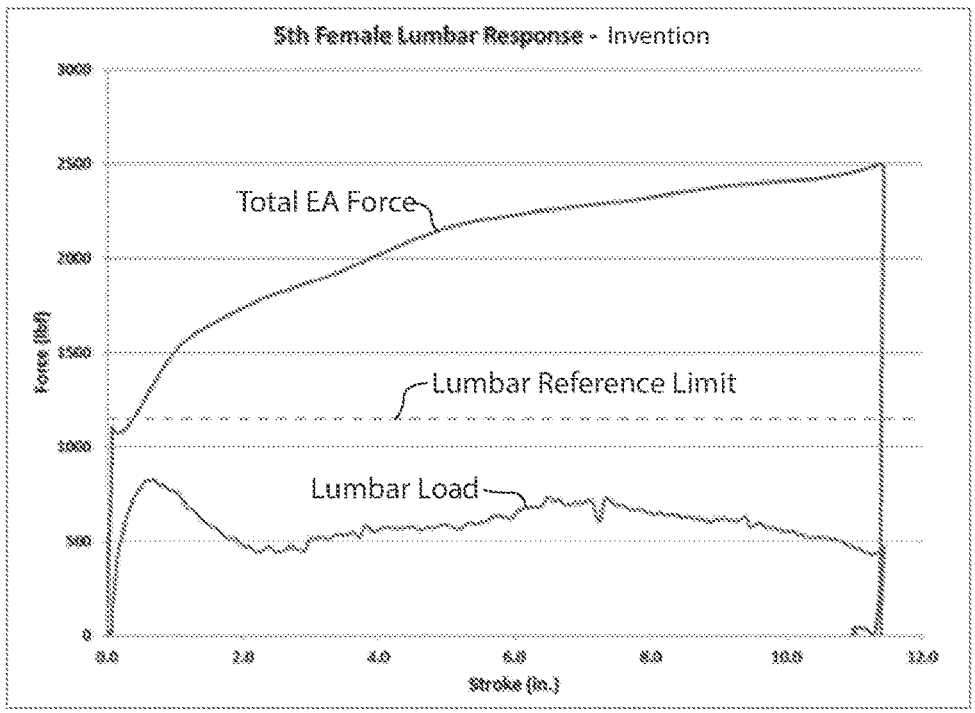
FIG. 8 is a graph of test data showing the effect on dynamic overshoot of decreasing the rate of loading onset for a $5^{th}$ percentile female.

FIG. 8 is a block diagram representing structure of one embodiment for processing information for controlling the seat system 100. In FIG. 8, the vehicle 6 includes an aircraft controller referred to as Electronic Control Unit for receiving signals from aircraft sensors. In FIG. 8, a port 30 on the seat system 100 receives information from the Electronic Control Unit. The port 30 can include electronic devices adapted for receiving either analog or digital information. The information can include at least an imminent crash signal as well as a signal 45 communicating the physical parameters 42 from the aircraft 6. The physical parameters 42 can include the aircraft attitude, altitude and velocity and the like. The velocity as discussed in the invention is substantially the vertical component of velocity along the z-axis as depicted in FIG. 1 or substantially vertically along the major dimension or height of the seat system 100.

In another embodiment (not shown), the seat system controller and on-board memory can connect directly to external sensors. From the port 30, the signals 45, as depicted in FIG. 5, are received by a seat system controller 175. A seat sensor 46 communicates the weight of the occupant to the seat system controller 175. The seat system controller 175 performs functions including receiving and processing the signals 45 from the Electronic Control Unit. Further, the seat system controller 175 calculates the required energy to be absorbed 31 based on the signals 45.

The seat system controller 175 can access a lookup table within an on-board memory 19 to select an appropriate discrete profile 20 for each seat and occupant. The algorithm of the seat system controller 175 selects the closest discrete profile 20 having energy absorption greater than or above the calculated value 31. In addition, the selected discrete profile 20 has sufficient energy absorption capacity to preclude the seat 12 from contacting the floor. The electromechanical or other devices 14 of the seat system 100 receive output signals 29 from the seat system controller 175 for selecting energy absorbing members 10 to establish the appropriate connection between the upper 24 and lower 26 portions to absorb the appropriate amount of energy for that occupant and that crash.

The primary configuration envisioned incorporates using the sensors already onboard the aircraft to sense aircraft velocity and direction, attitude, and time to impact. The airframe manufacturer would develop an algorithm which assesses the state of the aircraft considering velocity and direction, attitude, distance to the ground along with physical data on the aircraft which may include such parameters as rotor RPM, torque, etc. Using these parameters, the algorithm can predict whether a crash cannot be avoided and the aircraft is going to crash. That signal can be sent to the Electronic Control Unit mounted on the seat or mounted anywhere on the aircraft. If mounted on the aircraft, it can control all the seats on the aircraft. If mounted on the seat, each seat will probably need a separate unit. The location of the Electronic Control Unit, or the location of the equipment which calculates the energy to be absorbed and which selects the combination of energy absorbers to create the needed composite profile should not be a limitation of the present invention.

Figure 9:
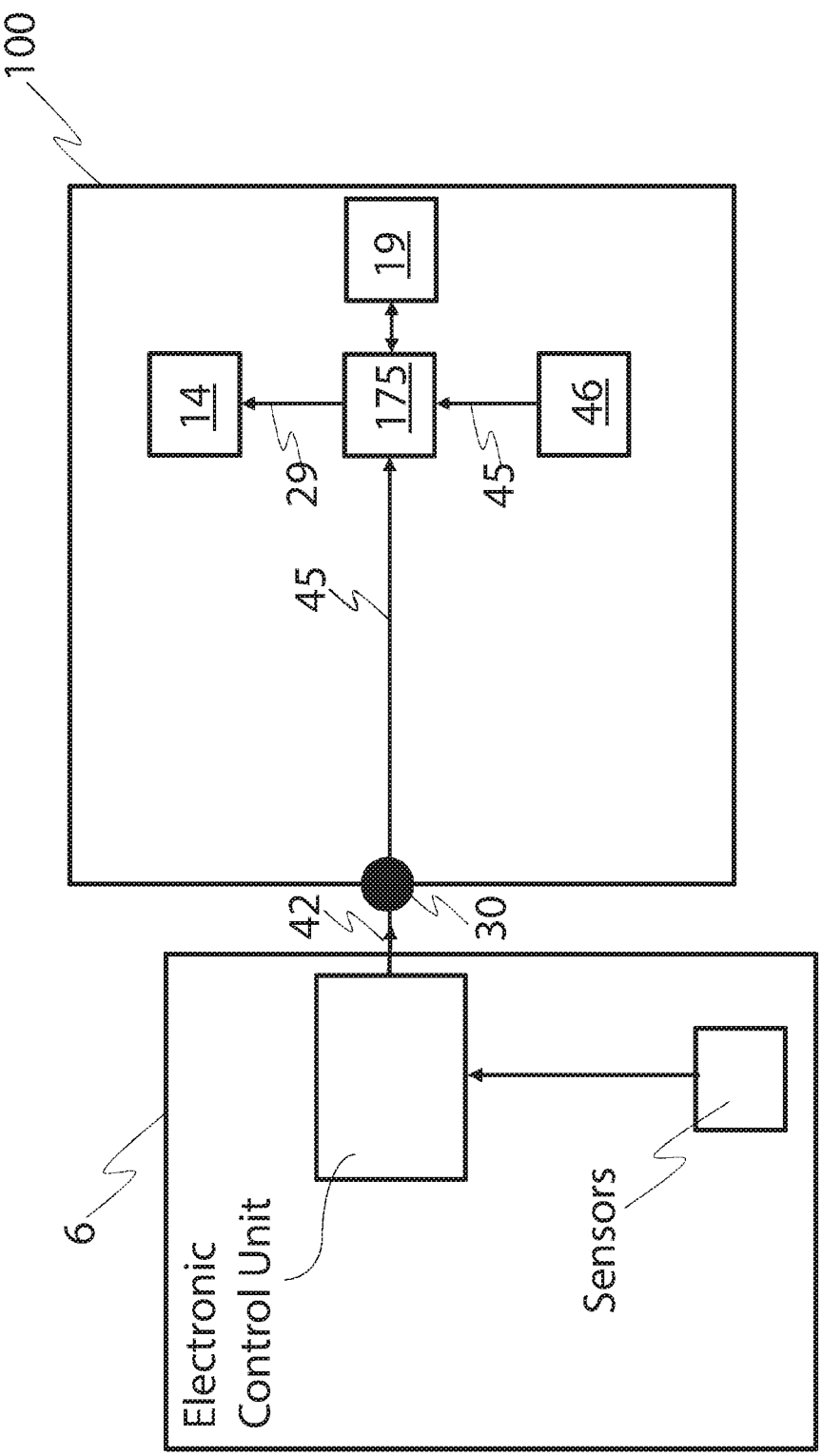
FIG. 9 is a block diagram illustrating the input and output signals within the seat system and between the seat system and the vehicle.
Figure 10:
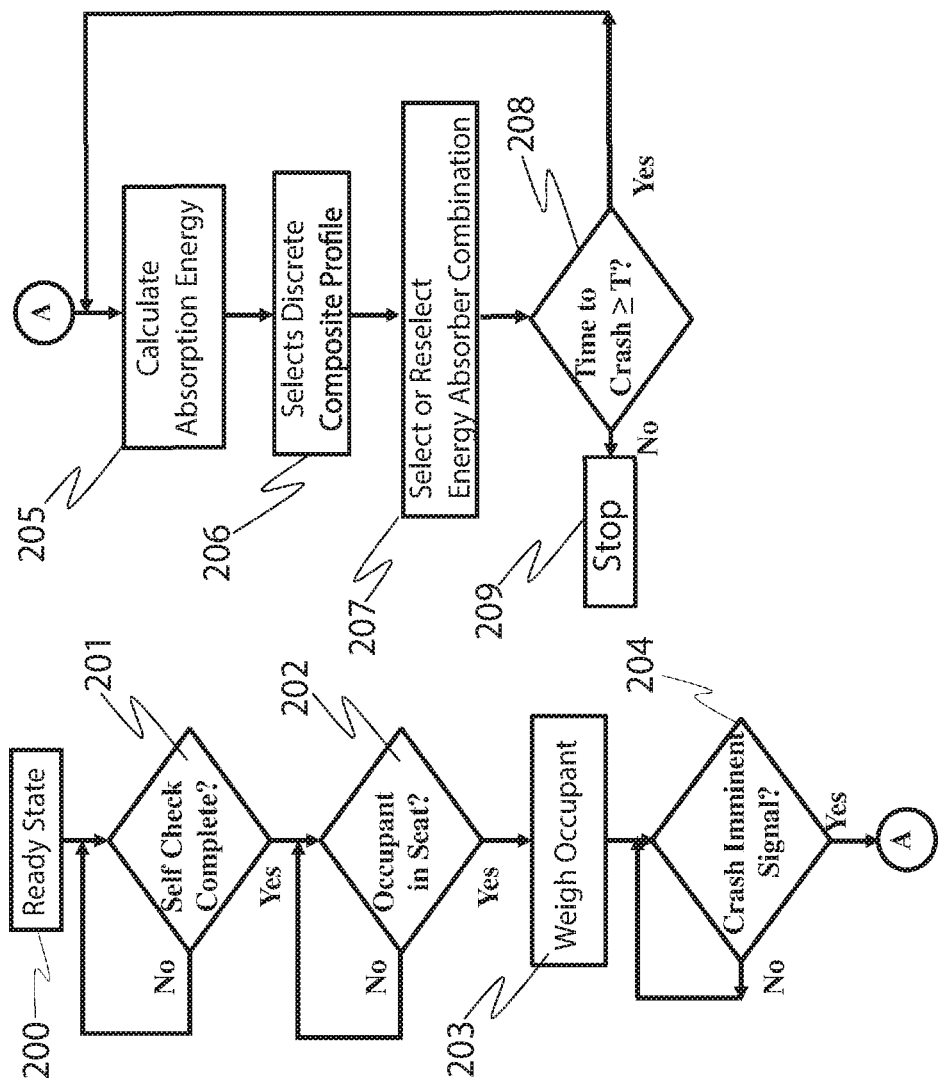
FIG. 10 is a flowchart of an algorithm for operating the seat system.
Figure 11:
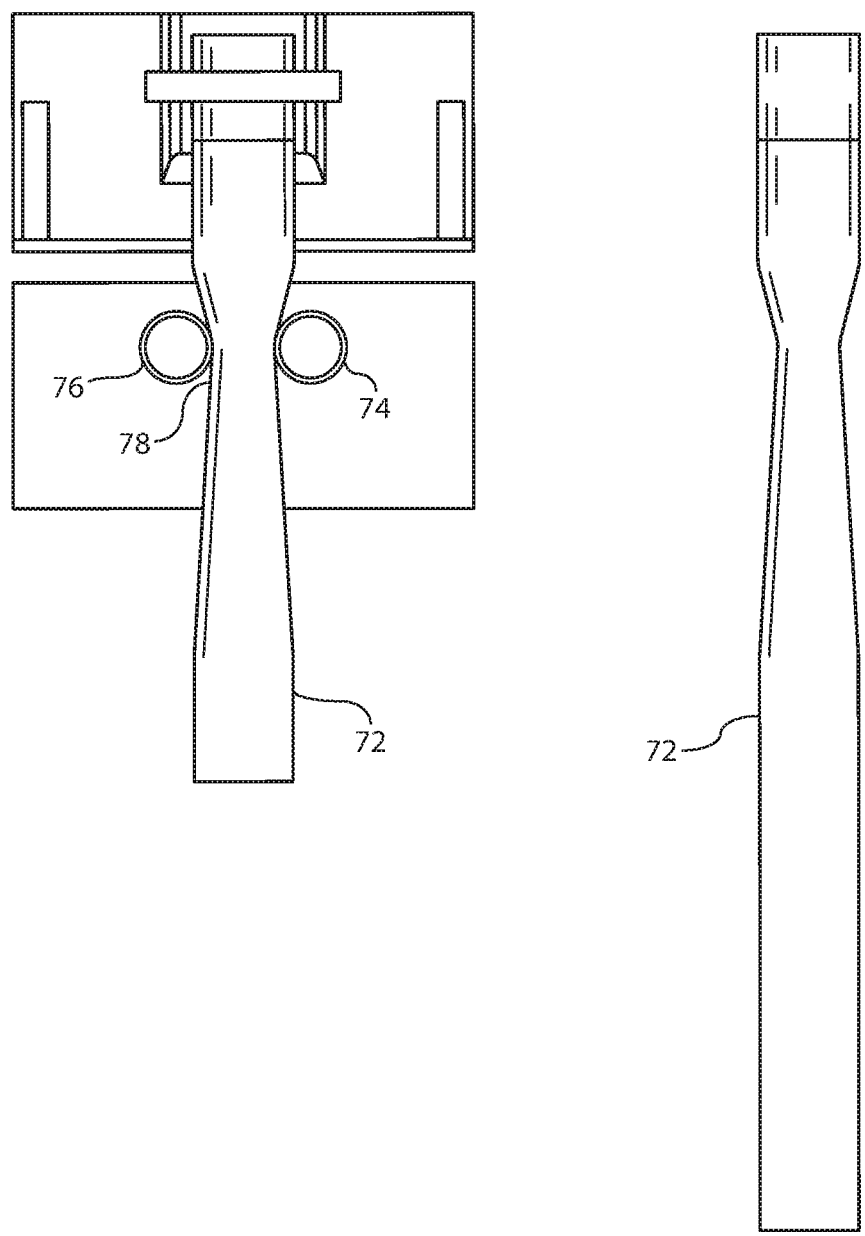
FIG. 11 is a drawing showing the cross section of an energy absorber illustrating the physical design of the roller/tube interface incorporating features of the present invention.

FIG. 9 is a flowchart showing blocks 200 through 209 and describes the steps of the process or algorithm of the software residing in the on-board memory 19 of the seat system controller 175 for the operation of the seat system 100 on the vehicle such as a helicopter. Initially, in block 200 after the occupant vacates the seat 12 (see FIG. 1), a ready state is established by preselecting any particular energy absorbing members 10 as an initial condition customized in the algorithm. This initial condition would normally be the specified setting for a midsized (50$^{th}$ percentile male) occupant. In block 201 of FIG. 6, the algorithm residing in the seat system controller 175 performs a self-check of the seat system 100 including continuity testing circuits of the electromechanical devices 14 to assure there are no open or short circuits and initiates polling to test functionality of the seat sensor 46 of the seat 12. In block 203, the occupant is weighed when seated per block 202 and a signal is sent to block 204. Block 204 selects the profile 20 having the required energy to decelerate that occupant's weight within the available stoke distance and activate/s the appropriate EA latching devise/s 36 (FIG. 1). For this setting the specified vertical pulse is used. In block 20 of FIG. 6, the algorithm looks for an imminent crash signal indicating that proximity to the ground, aircraft velocities and aircraft flight capabilities are such that a crash is imminent. The algorithm steps to block 205 if there is an imminent crash signal. In block 205, the algorithm calculates the energy to be absorbed 31 based on the physical parameters 42 communicated in the signal 45 (FIG. 5). In block 206, the software of the seat system controller 175 selects a new profile 20 based not only on the occupant weight but also on the predicted crash severity.

In block 207 of FIG. 9, particular electromechanical or other devices 14 are activated for selecting the energy absorbing members 10 to generate the selected discrete force vs stroke profile 20 by activating the associated latching device(s) 36 (FIG. 1). If no imminent crash signal is received, the seat system 100 maintains the existing combination of energy absorbing members 10. In block 208, a determination can be made by the algorithm based on how much remaining time is available and other crash parameters before an incipient crash and an updated profile 20 can be selected and engaged if time permits. The time needed to select a new combination of energy absorbing members 10 can range from about 50 milliseconds to about 150 milliseconds. If the estimated time to crash is not greater than about 150 milliseconds, the seat system controller 175 does not perform any additional commands and stops. Otherwise, the seat system controller 175 begins to repeat a portion of the process flow path by proceeding to calculate a new absorption energy 31 as depicted in block 205 of FIG. 9. In block 206 a new discrete force vs stroke profile 20 can be selected. In block 207 a new combination of energy absorbing members 10 can be selected. This reselection process of new energy absorbing members 10 combinations can occur periodically prior to a predicted and incipient crash. For example, a helicopter crashing from a high altitude can continue to accelerate to continuingly higher velocities on approaching a crash, but slow down prior to the crash as a result of pilot input (autorotation), thereby periodically generating the need for new discrete profiles 20 to accommodate a need for greater energy absorption or less as required. Further, the reselection process can continue periodically as long as the time to crash is of sufficient duration to allow for a reselection of the energy absorbing members 10. The term periodically is a function of the frequency of receiving imminent crash signals and the available time to crash. In addition, if the crash is predicted to have a lower velocity, the seat system controller 175 will select a discrete profile 20 that will absorb less energy based on a lower calculated absorption energy 31 and thus apply lower forces to decelerate the occupant during the crash. If on the other hand, the calculated absorption energy 31 is higher than the seat system controller 175 determines a discrete profile 20 to absorb more energy, thereby selecting an appropriate combination of energy absorbing members 10 to generate a new discrete profile 20. It is important to note that this algorithm is only one possible embodiment for using this invention and should not be considered a limitation of the invention. For example, the algorithm can be written not to include any reselection of energy absorbers.

Although certain illustrative embodiments and methods have been disclosed herein, it will be apparent from the foregoing disclosure to those skilled in the art that variations and modifications of such embodiments and methods may be made without departing from the invention. Accordingly, it is intended that the invention should be limited only to the extent required by the appended claims and the rules and principles of applicable law. Additionally, as used herein, references to direction such as "up" or "down" as well as recited materials or methods of attachment are intended to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record.

What is claimed is:

1. A method for minimizing injury to an occupant of a vehicle having a seat, the method comprising:
    providing an energy absorbing apparatus operatively connected between the seat and the vehicle, the energy absorbing apparatus comprising a plurality of Fixed Profile Energy Absorbers (FPEAs);
    detecting an incipient impact to the vehicle;
    determining an anticipated impact loading of the occupant;
    determining an absorption energy necessary to prevent injury to the occupant based on the anticipated impact loading and the occupant's mass; and
    prior to impact, selectively coupling at least one of said plurality of Fixed Profile Energy Absorbers between the seat and the vehicle to provide a predetermined; force versus stroke profile that will absorb the energy necessary to prevent injury to the occupant, whereby selectively coupling at least one of said plurality of Fixed Profile Energy Absorbers provides a variable force versus stroke profile simulating a Variable Profile Energy Absorber providing a frequency matched force on the occupant, whereby a lumbar load spike is avoided.

2. The method of claim 1, wherein:
    plural of said plurality of Fixed Profile Energy Absorbers have equal work increments.

3. The method of claim 1, wherein:
    plural of said plurality of Fixed Profile Energy Absorbers have unequal work increments.

4. The method of claim 1, wherein:

plural of said plurality of Fixed Profile Energy Absorbers have a predetermined load versus stroke profile that is piecewise linear in shape.

5. The method of claim 1, wherein:

each of said Fixed Profile Energy Absorbers has a fixed energy profile having an energy absorption value and the step of selectively coupling at least one of said plurality of Fixed Profile Energy Absorbers between the seat and the vehicle comprises selecting a lowest energy absorption value that is greater than the absorption energy necessary to prevent injury to the occupant.

6. The method of claim 1, wherein:

at least one of said plurality of Fixed Profile Energy Absorbers provide a decelerating force on the occupant that varies with stroke distance.

7. The method of claim 6, wherein:

the vehicle comprises a helicopter and the vehicle control system comprises an avionics system of the helicopter.

8. The method of claim 1, wherein:

the step of determining an anticipated impact load on the occupant comprises receiving information from vehicle-borne sensors.

9. The method of claim 1, wherein:

the step of determining an anticipated impact load on the occupant comprises receiving information from a vehicle control system.

10. The method of claim 1, wherein:

plural of said plurality of Fixed Profile Energy Absorbers comprise tubes having variable wall thicknesses.

11. The method of claim 10, wherein:

plural of said plurality of Fixed Profile Energy Absorbers comprise aluminum tubes.

* * * * *